June 9, 1931.  A. C. PEREBOOM  1,809,424
PROPELLER FOR DRIVING AND STABILIZING AIRCRAFT
Filed Nov. 28, 1928   2 Sheets-Sheet 1
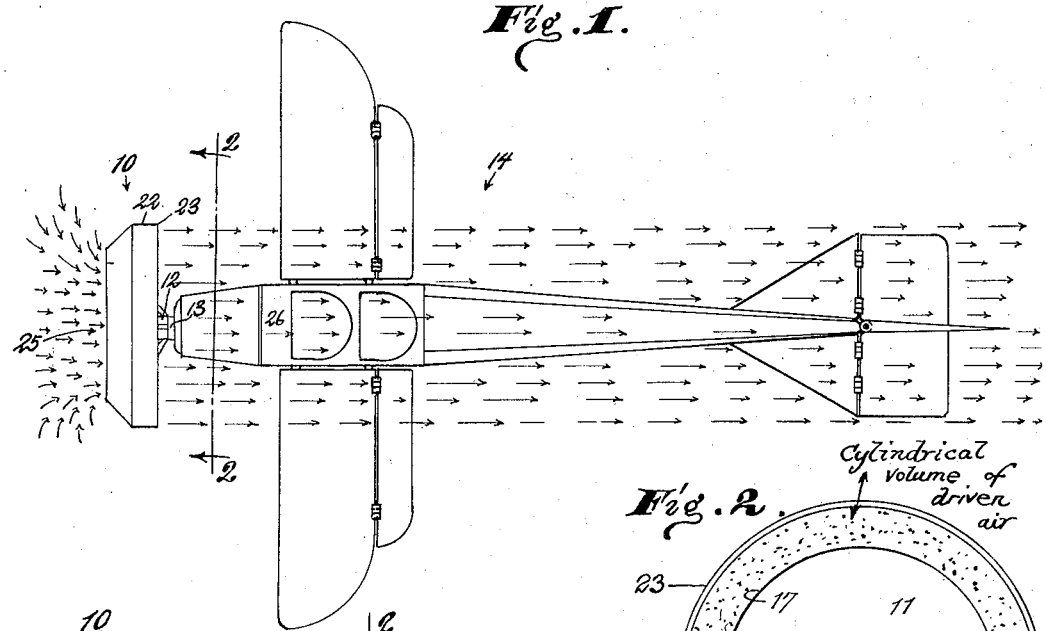
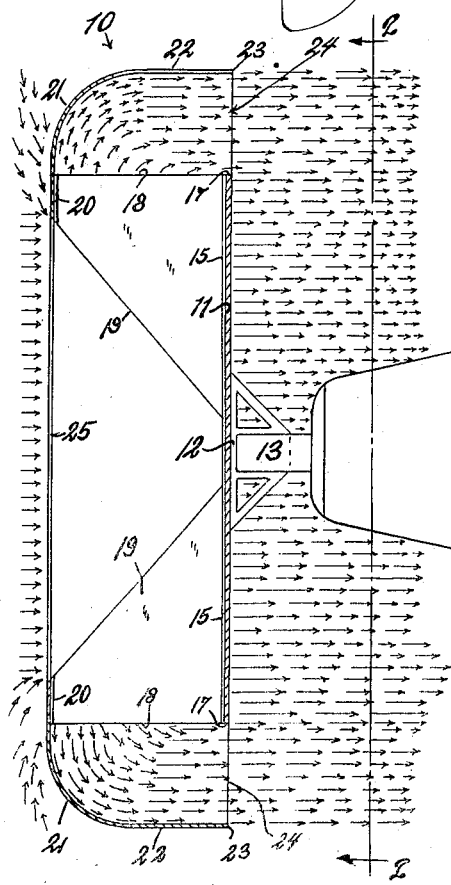
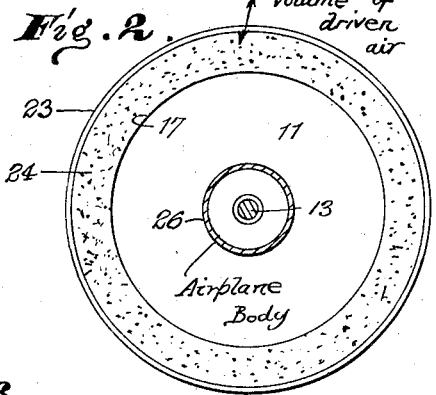
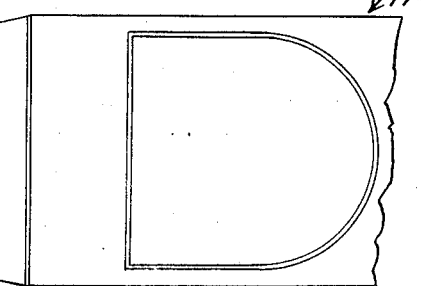
Inventor.
Andrew C. Pereboom.
by
Lockwood & Lockwood,
His Attorneys.

June 9, 1931.  A. C. PEREBOOM  1,809,424
PROPELLER FOR DRIVING AND STABILIZING AIRCRAFT
Filed Nov. 28, 1928  2 Sheets-Sheet 2
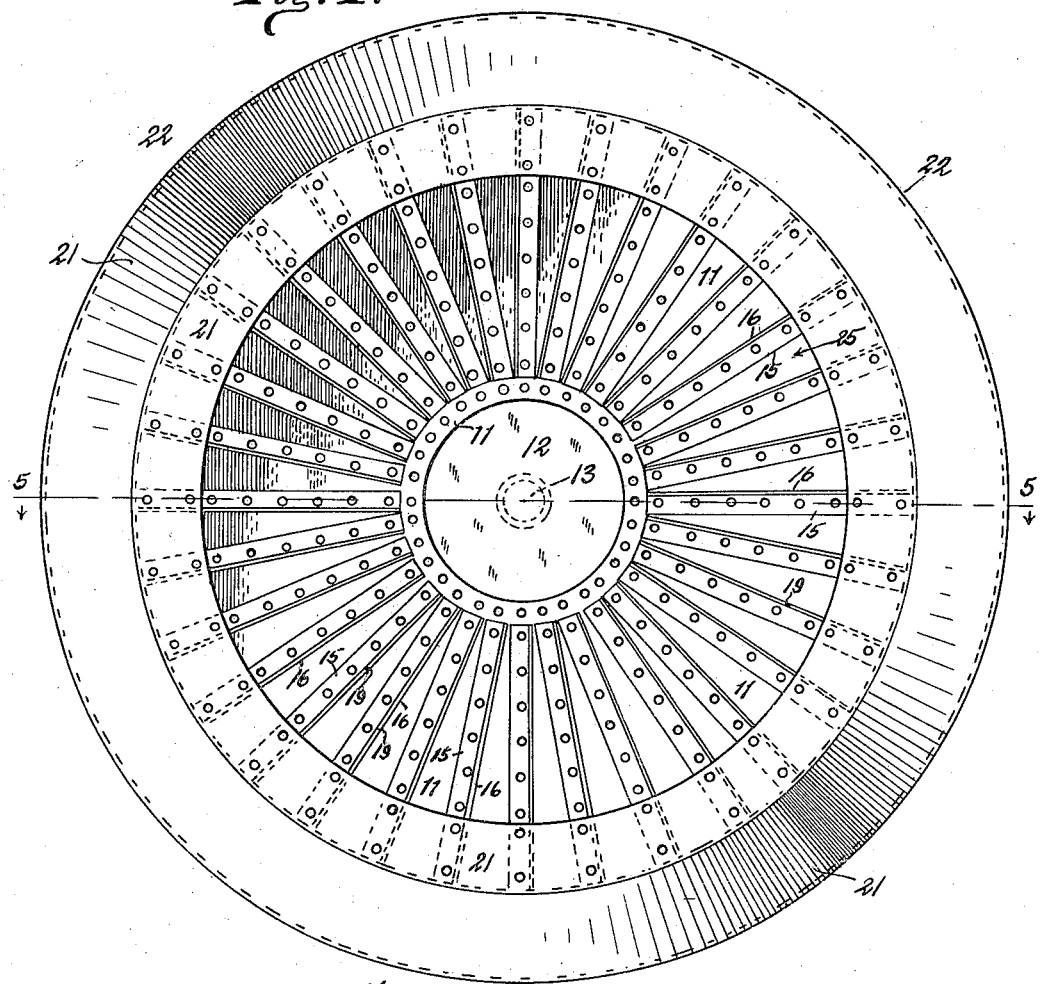
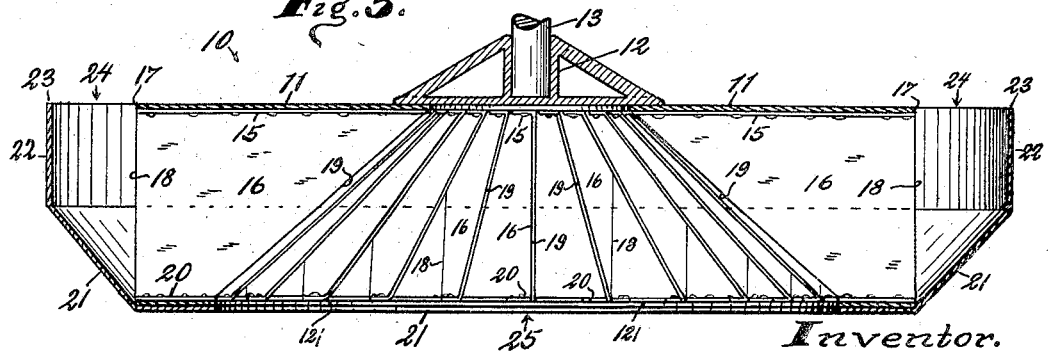
Inventor.
Andrew C. Pereboom.
by
Lockwood & Lockwood,
His Attorneys.

Patented June 9, 1931

1,809,424

UNITED STATES PATENT OFFICE

ANDREW C. PEREBOOM, OF LOS ANGELES, CALIFORNIA

PROPELLER FOR DRIVING AND STABILIZING AIRCRAFT

Application filed November 28, 1928. Serial No. 322,518.

This invention relates to a propeller for an aircraft and the principal object thereof is to provide a propeller adapted to cause a displacement of air in such a manner as to propel the aircraft forward and simultaneously stabilize it by enveloping the aircraft in a volume of driven air that is of relatively uniform velocity all around the aircraft. In other words the air is drawn in from the front of the propeller so as to form a partial vacuum into which the aircraft is first driven transversely and then the air is driven out of the propeller from an enlarged annular outlet so as to drive the aircraft forward; and also so that the aircraft is enveloped and moving in the center of a field of driven air that tends to stabilize it.

Another object of the invention is to provide an aircraft propeller that is constructed of sheet metal, preferably aluminum, that is of exceedingly light weight that can be safely driven at high speed to cause a great displacement of air and thereby propel an aircraft into the space of the displaced air.

Features of invention are shown in the construction, combination and arrangement of parts whereby a propeller is provided that is easy to construct, assemble and operate, that is of exceedingly light weight, effective in action and strong and durable in use.

Other objects, advantages and features of invention may appear from the accompanying drawings, the subjoined detailed description and the appended claims.

Fig. 1 is a plan view of an aircraft driven by a propeller that is constructed in accordance with this invention, the direction of the displaced air being indicated by arrows.

Fig. 2 is a semidiagrammatic cross section on line 2—2 of Figs. 1 and 3, showing the body of the aircraft enveloped in a cylindrical column of driven air.

Fig. 3 is a semidiagrammatic sectional view of the propeller on an enlarged scale and showing a rounded nose instead of a tapered nose as shown in Fig. 1, also showing by arrows the displaced air moving in a cylindrical column to envelope the body of the aircraft, a portion of which is shown.

Fig. 4 is an enlarged front elevation of the propeller detached from the aircraft and showing it with a tapered nose.

Fig. 5 is a section on line 5—5, Fig. 4, showing an arrangement of the propeller blades and also showing the tapered nose reinforced by a front plate that is secured to the blades.

The propeller 10 includes a back plate 11 to which a flanged hub 12 is secured in any well known way, and this hub is secured to the engine shaft 13 of the airplane 14.

The aircraft can be of any well known type that is provided with an engine having a forwardly extending shaft 13.

The back plate 11 of the propeller is of considerable size and is in the form of a disk and secured to this plate are the flanges 15 that are integral with the inner end of the propeller blade 16, and the flanges are secured to the plate so that the inner ends of the blades are arranged radially relative to the longitudinal axis of the shaft 13 and extend straight forward from the back plate; and preferably the inner end of the blades are of great width and extend from adjacent the center of the plate 11 to its marginal edge 17. The body of each blade 16 is straight and arranged radially so that they drive the air in the propeller transversely to the axis of the shaft 13 against the deflector 22.

The blades 16 are extended forwardly a considerable distance from the back plate 11 and in advance of the shaft 13 with their top edges 18 in line with the edge 17 and parallel with the shaft 13. These blades are also tapered so that their inner edges 19 angle outwardly from the axis of the shaft 13 so that the front end of the blades are about one-third the width of the back ends, and integral with the front ends of the blades are flanges 20 that are secured either to the nose plate 21, as indicated in Fig. 3, or to a front plate 121, as indicated in Fig. 5; and through these plates is extended the air inlet opening 25 that is larger in diameter than the diameter of the body of the aircraft 14.

Integral with the nose plate 21 is a deflector 22 that has its rear edge 23 in line with the back plate 11, and is spaced a considerable distance away from the edge 17 so as to form a large annular discharge outlet 24 rearward of the propeller so that air taken in at the inlet opening 25 in front of the propeller is first driven transversely to the axis of the shaft 16 and then is discharged rearwardly in the form of a cylindrical volume of driven air that envelopes the body 26 of the propeller. It is understood that the nose of a propeller can be tapered as shown in Figs. 1, 4 and 5, or rounded as shown in Fig. 3.

Preferably the propeller is made of sheet aluminum so that it is very light, also all the parts are either riveted or welded together so that the propeller is very strong.

In operation the propeller is driven as is any ordinary propeller; and the rotation of the blades drives the air from the interior thereof transversely, as previously stated against the deflector 22 and then out of the discharge annular opening 24 between the edges 17 and 23 in lines parallel to the longitudinal axis of said shaft.

This displacement of air in the propeller causes suction that acts on the air in advance of it to draw the air into the propeller and simultaneously drives the propeller forwardly. In other words when the propeller is driven there is a continuous intake of air from in front of the propeller to replace the air displaced transversely by the blades 16, and the volume of displaced air is discharged rearwardly with great force to drive the aircraft forwardly, also the rearward discharge of air aids in stabilizing the aircraft as the discharge of air is from a large annular outlet, so that the aircraft is completely surrounded by driven air in the form of an imaginary cylinder through which the aircraft is caused to travel so that the course of the aircraft is not easily affected by cross winds to unbalance it.

In other words the propeller displaces a large field of driven air in which the aircraft is caused to fly, and as this field of air is driven with great velocity it is not easily affected by an ordinary air current.

I claim as my invention:

A propeller for driving and stabilizing an aircraft including a flanged hub secured to the engine shaft of the aircraft, a back plate arranged transversely to said shaft that is secured to said hub, taper blades arranged radially relative to the longitudinal axis of said shaft and extended straight forward from said back plate, flanged rear ends to said blades that are secured to said back plate, as casing enclosing said blades, a nose plate integral with said casing and arranged parallel to said back plate, forward end flanges to said blades that are secured to said nose plate so as to support said casing in advance of said blades, said nose plate having an air inlet therethrough that is greater in diameter than the diameter through the body of said aircraft, and a circumferential wall integral with said casing surrounding the rim of said back plate and spaced therefrom to form an annular discharge outlet through which said propeller can drive a cylindrical column of air so as to surround and stabilize said aircraft and propel it forward substantially as described.

In witness whereof, I have hereunto affixed my signature.

ANDREW C. PEREBOOM.